UNITED STATES PATENT OFFICE.

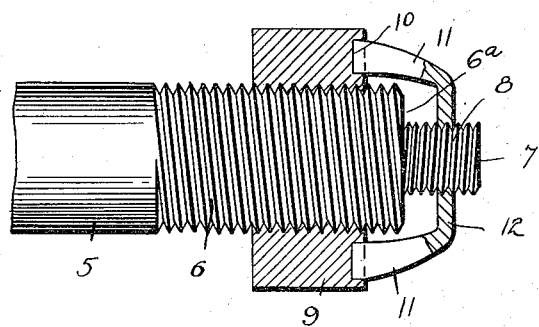
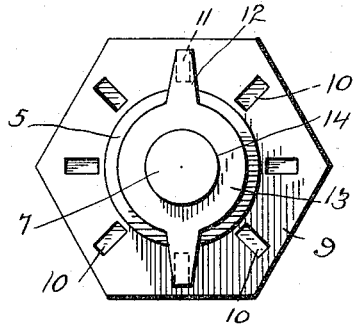
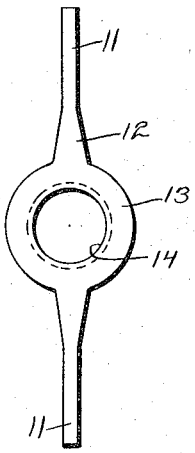

JOSEPH H. WINES, OF DETROIT, MICHIGAN.

NUT-LOCK.

1,155,858. Specification of Letters Patent. Patented Oct. 5, 1915.

Application filed April 13, 1915. Serial No. 21,052.

*To all whom it may concern:*

Be it known that I, JOSEPH H. WINES, a citizen of the United States, residing at Detroit, in the county of Wayne and State of Michigan, have invented certain new and useful Improvements in Nut-Locks; and I do hereby declare the following to be a full, clear, and exact description of the invention, such as will enable others skilled in the art to which it appertains to make and use the same.

This invention has for its primary object to provide a simple and efficient nut lock embodying essentially a locking member having an internally screwthreaded opening fitting upon the reduced end of a bolt having screwthreads arranged oppositely to the screwthreads upon the body thereof, said locking member including a pair of angularly directed spring arms engaged within notches formed in the adjacent or outer face of the nut for reliably locking the latter against rotational movement upon the bolt.

With this and other objects in view, the invention consists in the novel construction, arrangement and formation of parts as will be hereinafter specifically described, claimed and illustrated in the accompanying drawing, in which:

Figure 1 represents a fragmental side elevation of the bolt, illustrating the nut and lock therefor in section. Fig. 2 represents an end elevation of the nut lock, and Fig. 3 represents a plan view of the blank from which the locking member is formed.

Referring to the drawing in detail, wherein similar reference numerals designate corresponding parts throughout the several views, the numeral 5 indicates the shank of a bolt of the usual or any preferred construction having external screwthreads 6 extending inwardly from the shoulder 6ª formed by the reduced end 7 thereof and having screwthreads 8 on the reduced end formed oppositely to the screwthreads 6 upon the body of the bolt 5.

A nut 9 is fitted upon the screwthreads of the bolt 5 and is formed in its outer surface with a plurality of notches or recesses 10 arranged in diametrically opposed pairs and adapted to receive the enlarged extremities of the spring arms 11 of the locking member 12, which is substantially U-shape in longitudinal section having the enlarged medial or web portion 13 formed with an internally screwthreaded bore or opening 14 fitting the reduced screwthreaded end 7 of the bolt.

In use, the nut 9 is fitted upon the screwthreaded end 6 of the bolt 5 and is advanced to the desired position thereon, and the locking member is subsequently fitted upon the reduced screwthreaded extremity 7 of the bolt and advanced until the free ends of the spring arms 11 thereof are engaged in a pair of the diametrically opposed notches 10 in the nut 8, and thus the latter is reliably locked against rotational movement upon the bolt 5.

What I claim is:

1. In a nut lock, a locking member substantially U-shape in formation and including an enlarged web portion having an internally screwthreaded opening therethrough.

2. In a nut lock, a locking member of substantially U-shape having an enlarged web or medial portion formed with an internally screwthreaded opening, the substantially parallel ends of said locking member being increased in width.

3. A nut lock comprising a bolt having a reduced end, screwthreads extending inwardly from the inner extremity of the reduced end, screwthreads extending inwardly from the reduced end and arranged oppositely to the screwthreads on the body of said bolt, a nut fitted upon said bolt, and a substantially U-shaped locking member having an internally screwthreaded aperture in the web thereof receiving the reduced end of said bolt and including a pair of spring arms engaged within the notches in said nut.

In testimony whereof I affix my signature in presence of two witnesses.

JOSEPH H. WINES.

Witnesses:
GUSTAV DROGAWSKY,
E. LA BUSCHEWSKY.

Copies of this patent may be obtained for five cents each, by addressing the "Commissioner of Patents, Washington, D. C."